J. McCALLUM.
Potato-Diggers.

No. 149,051.

Patented March 31, 1874.

Witnesses.
John Grist Junr
H. H. Horsey

James McCallum
Inventor
by his Attorney
Henry Grist

UNITED STATES PATENT OFFICE.

JAMES McCALLUM, OF NEPEAN, CANADA.

IMPROVEMENT IN POTATO-DIGGERS.

Specification forming part of Letters Patent No. 149,051, dated March 31, 1874; application filed January 17, 1874.

*To all whom it may concern:*

Be it known that I, JAMES McCALLUM, of the township of Nepean, in the county of Carleton, in the Province of Ontario and Dominion of Canada, have invented Improvements in Potato-Diggers, of which the following is a specification:

My invention relates to improvements in that class of diggers which have an endless apron and a riddle operating within the carrying-frame; and it consists, first, in imparting to the riddle a vertical jarring motion by means of tappet-bars under the rear end of the riddle, the front end of the riddle being pivoted horizontally to the main frame, the object being to cause a more effectual separation of the potatoes and earth; second, in combination with the carrying-frame, endless apron, and riddle, the arrangement of the tappet-wheels and bars, for operating the riddle and apron combinedly and simultaneously, the object being to lessen the cost of construction by simplifying the mechanical combination of devices.

Figure 1:
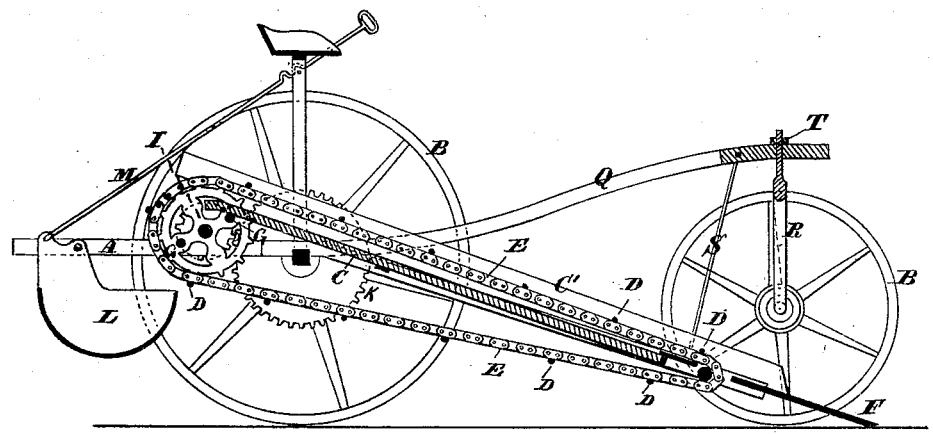
Figure 2:
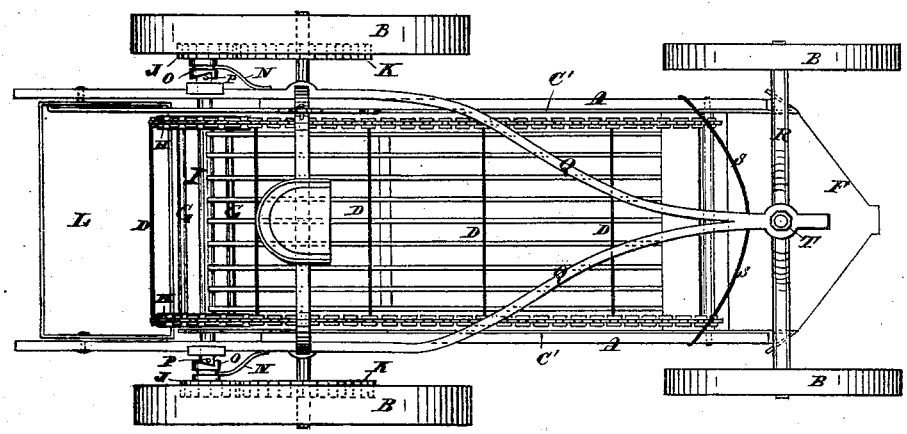

Figure 1 is a longitudinal vertical section of a machine embodying my invention, taken on the line *a a*, Fig. 2; and Fig. 2 is a top view of the machine.

A is the main frame of the carriage, mounted on wheels B, by which the operating parts are actuated. C' are supplementary sides, secured to the frame A, and with which frame and carriage the endless apron, composed of the chains E and transverse bars D, operates. F is the shovel, secured to the lower end of the frame A. The riddle C is composed of horizontal bars, pivoted horizontally to the frame A at its lower end, and the upper ends of the bars bear on tappet-bars G, rotating around the shaft of the endless-chain wheels H, in which wheels the ends are inserted, the said shaft having its bearings on the frame A, rearward of the ground-wheels; or the tappet-bars may be dispensed with, and the shaft I formed with a series of cranks, so that by their rotation alternate bars of the riddle will be raised simultaneously by alternate cranks; or the bars may be operated uniformly or together.

The tappet-bar motion is preferably employed for light land, and the crank motion adapted for heavy soil.

On both ends of the shaft I are placed loose pinions J, which mesh with cog-wheels K, secured to the hub of the ground-wheels, so that, when the machine is moved onward, the endless apron and riddle are operated combinedly through the medium of the cog-wheels and pinion.

This vertical motion of the riddle-bars separates the potatoes from the earth, and the latter falls between the bars. The potatoes at the same time are carried upward over the top of the riddle by the bars of the endless apron, and fall into a tail-trough, L, which is suspended on pivots between the sides of the frame A. The trough is kept from vibrating by the rod M, which also serves to cant it at intervals to discharge the potatoes.

The trough may be dispensed with, and a tail-riddle employed for distributing the potatoes uniformly on the ground.

N is a flat spring, secured at both sides of the frame A, one end entering a groove in a collar-flange, O, cast on the pinion J, and which flange is notched spirally on its exposed end to engage with a pin, P, inserted in the shaft, so that, when the ground-wheels are reversed in turning the machine, the pin does not catch in the notches, thus allowing the pinion to turn freely on its shaft without operating the riddle or the apron from either side, and thereby allows the machine to be turned within a short radius. The springs keep the pin and flange together. Q is an arm, bifurcated to secure it to the longitudinal sides of the frame A; and it extends forward and pivots on the axle R of the truck-wheels, to support the front end of the machine suspendedly by side rods S. The shovels can be elevated by means of a nut, T, screwing on the center pivot of the axle, raising the arm to any desired height.

I claim as my invention—

1. In a potato-digger, the riddle C, having a vertical motion imparted to the bars, in combination with an endless apron, both operating within the frame A, as and for the purpose set forth.

2. The combination of the endless-chain wheels H and tappet-bars G, said bars being supported by and connecting the wheels H, the axle I, and cog-gears, for operating the endless apron and riddle conjointly, in the manner described.

JAMES McCALLUM.

Witnesses:
HENRY GRIST,
JOHN GRIST, Junr.